United States Patent [19]

Ansaldi et al.

[11] Patent Number: 4,475,406
[45] Date of Patent: Oct. 9, 1984

[54] ULTRASONIC DEVICE FOR THE MEASUREMENT OF THE DELIVERY OF A FLUID IN A CONDUIT

[75] Inventors: Ermanno Ansaldi; Stefano Re Fiorentin, both of Turin, Italy

[73] Assignee: Centro Ricerche Fiat S.p.A., Turin, Italy

[21] Appl. No.: 396,328

[22] Filed: Jul. 8, 1982

[30] Foreign Application Priority Data

Jul. 10, 1981 [IT] Italy ............................. 67961 A/81

[51] Int. Cl.³ .............................................. G01F 1/66
[52] U.S. Cl. .................................. 73/861.29; 73/118.2
[58] Field of Search .......... 73/118 A, 861.18, 861.27, 73/861.28, 861.29, 861.31

[56] References Cited

U.S. PATENT DOCUMENTS

| 3,965,730 | 6/1976 | Innes | 73/118 |
| 4,080,837 | 3/1978 | Alexander et al. | 73/61.1 R |
| 4,104,915 | 8/1978 | Husse | 73/118 X |
| 4,375,204 | 3/1983 | Yamamoto | 73/118 A |

FOREIGN PATENT DOCUMENTS 1355634 2/1964 France ..................... 73/861.29

OTHER PUBLICATIONS

J. L. McShane, "Ultrasonic Flowmeters", Flow, Its Measurement & Control in Science & Industry, vol. 1, part II, 1974, pp. 897–913.

Primary Examiner—Charles A. Ruehl
Attorney, Agent, or Firm—Michael N. Meller

[57] ABSTRACT

An ultrasonic device for measuring the delivery of fluid through a conduit. A pair of electroacoustic transducers are arranged in the wall of the pipe forming the conduit in a mutually confronting relationship along an axis inclined relative to the conduit axis. Each transducer is able to convert an electric signal of predetermined frequency into an ultrasonic wave which propagates through the fluid toward the confronting transducer. After a predetermined interval of transmission, each transducer receives the transmitted wave and converts it to an electric signal. A collimator is disposed in the path of the fluid upstream of the transducers. An oscillator outputs electrical signals of predetermined frequency to the transducers. In response to receipt of the ultrasonic waves, the transducers send electric signals to processing circuitry which detects the phase difference between the ultrasonic waves received by the respective transducers and correlates the phase difference with the delivery of fluid in the conduit.

4 Claims, 4 Drawing Figures

ULTRASONIC DEVICE FOR THE MEASUREMENT OF THE DELIVERY OF A FLUID IN A CONDUIT

BACKGROUND OF THE INVENTION

The present invention relates to an ultrasonic device for the measurement of the delivery of a fluid in a conduit.

In particular, the present invention relates to a device based on the principle of the detection of the deviation of the phase difference provided by two ultrasonic signals which are transmitted and received between respective electroacoustic transducers in two opposing directions, the transducers being disposed inside a conduit in which fluid flows.

More particularly, the present invention relates to a device of the above-mentioned type and advantageously usable in the automotive field for the measurement of the air delivery in direct injection engines, for which it has been observed that the mass delivery values are typically in the range between 0 and 150 grams/second and are subject to very sudden changes.

As is known, in the measuring devices of the above-mentioned type, the electroacoustic transducers are suitably arranged in the wall of a pipe delimiting the conduit and along an axis which is obliquely disposed in relation to the axis of the conduit itself, so that the signals transmitted and received are functions of the modulus of the speeds of the fluid in the conduit and the angle that the straight line connecting the transducers makes with the axis of the conduit. It has been observed, however, that the information delivered by such devices displays good correlation between phase changes and air mass delivery only in a situation of slow steady flow (e.g., 20 g/sec), while they are less reliable when the flow inside the conduit is turbulent, that is, when the radial components of the vector repsesenting the fluid speed become significant in relation to the axial components. Unfortunately in the automotive applications the degree of turbulence of the air passing through the measuring conduit is somewhat high, whereupon, at present, none of the devices of the above-mentioned type are suited to carry out delivery measurements reliably. On the other hand, the use of mechanical devices in these cases is absolutely inexpedient, both due to adverse effect of their inertia on the response speed, and because, as a consequence of their structure comprising moving mechanical members, they are more liable to failures due to wear.

SUMMARY OF THE INVENTION

An object of the present invention is to realize a device for measuring the delivery of fluid in a conduit which gives information on the delivery value of the fluid, can be advantageously used for the measurement of delivery of gaseous fluid in a wide range of values of the speed of the fluid, has a short response time and therefore is suited to follow fast changes of delivery, has no moving mechanical members, and is reliable and relatively inexpensive.

According to the present invention a device for measuring the delivery of a fluid in a conduit is provided comprising:

a pair of electroacoustic transducers arranged in the wall of a pipe forming a conduit and confronting each other along an axis which is obliquely disposed at a predetermined angle in relation to the axis of the conduit; each of the transducers being able to convert an electric signal having a predetermined frequency into an ultrasonic wave which propagates in the fluid toward the transducer diametrically opposite, which transducer receives the ultrasonic wave and converts it into an electric signal;

a collimator for the fluid, which occupies completely the cross-sectional area of the conduit and is placed upstream of the pair of electroacoustic transducers;

a generator suited to produce the electric signals having a predetermined frequency and to input them to the transducers;

processing means which are connected with the transducers, giving information on the phase difference between the ultrasonic signals received by the transducers and correlating this phase difference with the delivery of the fluid in the conduit.

BRIEF DESCRIPTION OF THE DRAWINGS

For a better understanding of the present invention, a preferred embodiment thereof will now be described with reference to the accompanying drawings, in which.

DETAILED DESCRIPTION OF THE INVENTION

Figure 1:
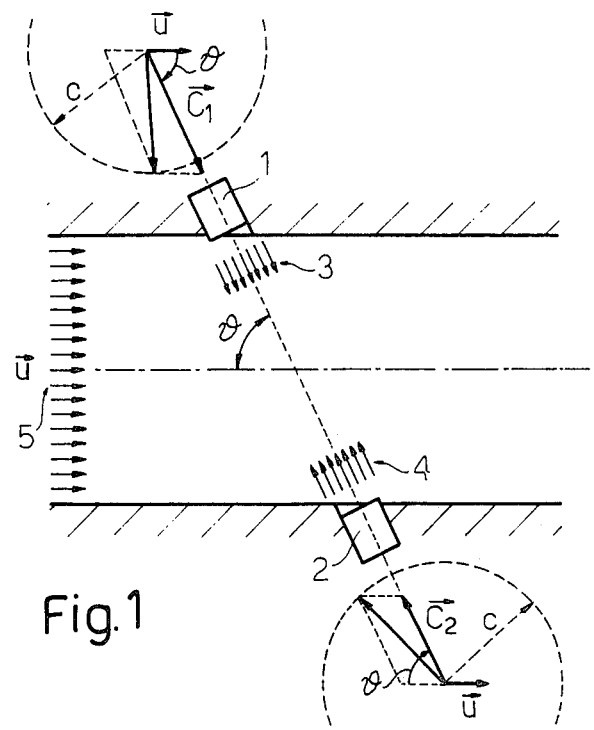
FIG. 1 shows the vectorial composition of the velocity of the fluid in a conduit with the velocities of two propagating ultrasonic waves in the conduit.

FIG. 1 is a diagram illustrating the interaction of a fluid 5 in movement at a speed $\vec{u}$ with the ultrasonic waves 3, 4 produced by two transducers 1, 2 oriented in a direction forming an angle $\theta$ with the direction of fluid movement. Each of the two transducers is suited to receive a portion of the ultrasonic wave produced from the other transducer and traveling along said direction which joins the two transducers. The corresponding speeds of propagation $\vec{C}_1$, $\vec{C}_2$ of the waves 3 and 4 can be obtained by means of the vectorial constructions represented in FIG. 1, in which the traced circles (shown in dotted lines) have a radius equal to the modulus of the speeds $\vec{C}$ of the sound in the fluid under examination.

Figure 2:
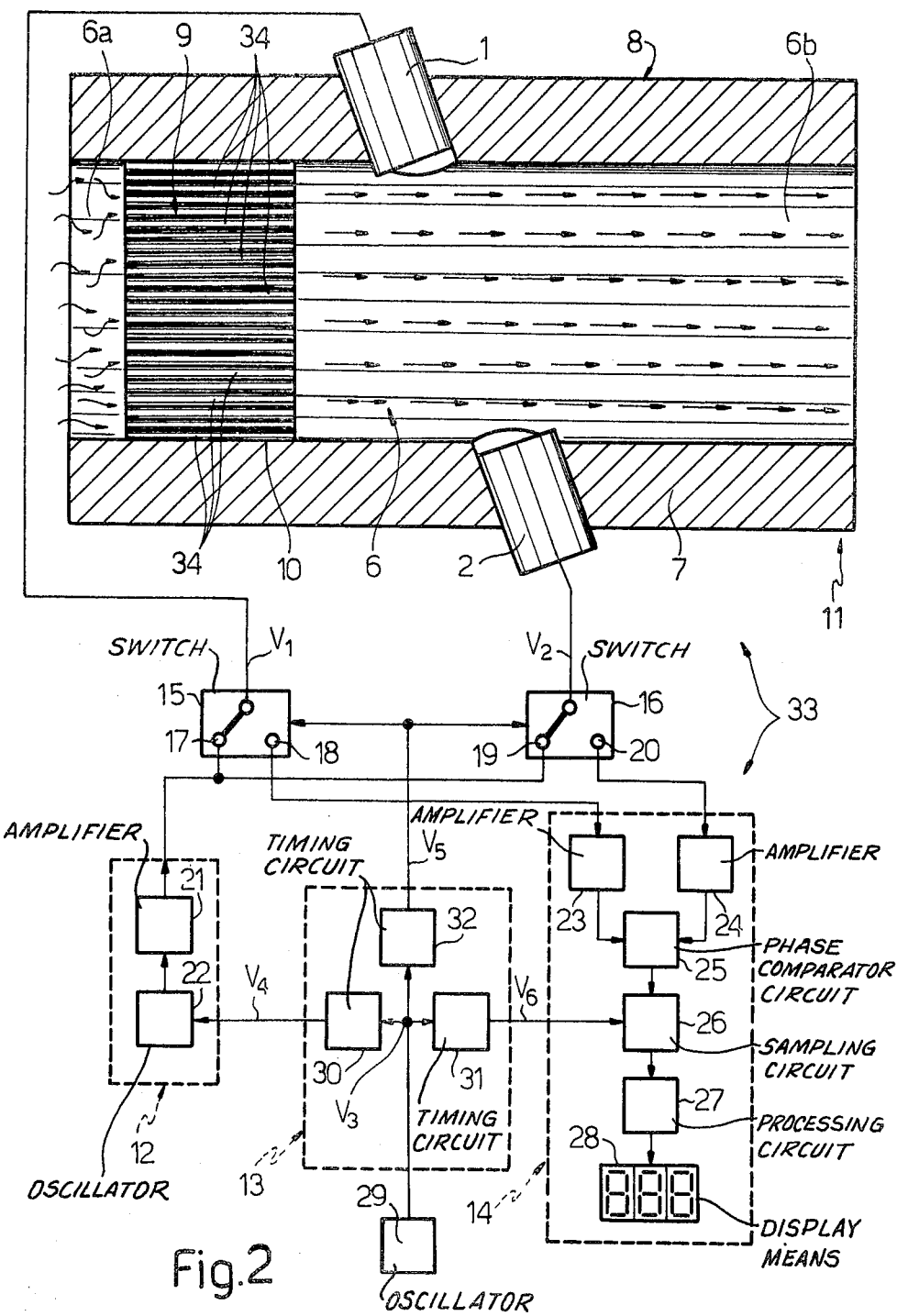
FIG. 2 is a diagram of a measuring device realized according to the present invention, including the block diagram of an electronic circuit.

FIG. 2 generally shows a device 33 for measuring the delivery of a fluid flowing in a conduit 6, and more exactly between an inlet section 6a and an outlet section 6b of the conduit 6 itself.

The device 33 comprises substantially an instrumental length 11 of the conduit 6 in which the fluid to be measured flows; a transmission unit 12, a reception and processing unit 14 and a timing unit 13.

Inside the instrumented length 11 is mounted the pair of electroacoustical transducers 1, 2 (see FIG. 1), each of which is arranged in the wall 7 of a pipe 8 forming the conduit 6. In particular, the transducers 1 and 2 are arranged facing each other and according to an axis sloping at a predetermined angle (conveniently the angle $\theta$ of FIG. 1) in relation to the axis of conduit 6. According to the present invention, the instrumented length 11 includes a collimator 9 (to be described in more detail with reference to FIG. 4) which occupies completely the cross section of an area 10 of conduit 6 situated between the inlet section 6a and the outlet section 6b of the conduit 6 itself and upstream of the pair of transducers 1, 2.

The transmission unit 12 comprises, connected in cascade, respectively an oscillator 22 and an amplifier 21. In particular, the oscillator 22 produces, during time intervals of predetermined duration, an electric signal which is sinusoidal or rectangular, having an appropriate frequency which, in the case of delivery measurements on gaseous fluids, is on the order of some hundreds of KHz, whilst, in the case of delivery measurements on liquid fluids, it is conveniently on the order of several MHz.

The reception unit 14 has, connected in cascade and starting from the pair of switches 15 and 16, a pair of amplifiers 23, 24, a phase comparator 25 and a controlled sampling circuit 26. The outlet of the controlled sampling circuit 26 is connected to the inlet of the processing circuit 27, the outlet of which feeds a display unit 28, for instance of the kind comprising display elements with seven segments.

The timing unit 13 comprises three timers 30, 31, 32, each of which has its inlet activated by an oscillator 29 and the outlets of which are connected with enabling circuits of the oscillator 22, of the sampling circuit 26 and of the switches 15 and 16, respectively.

Figure 3:
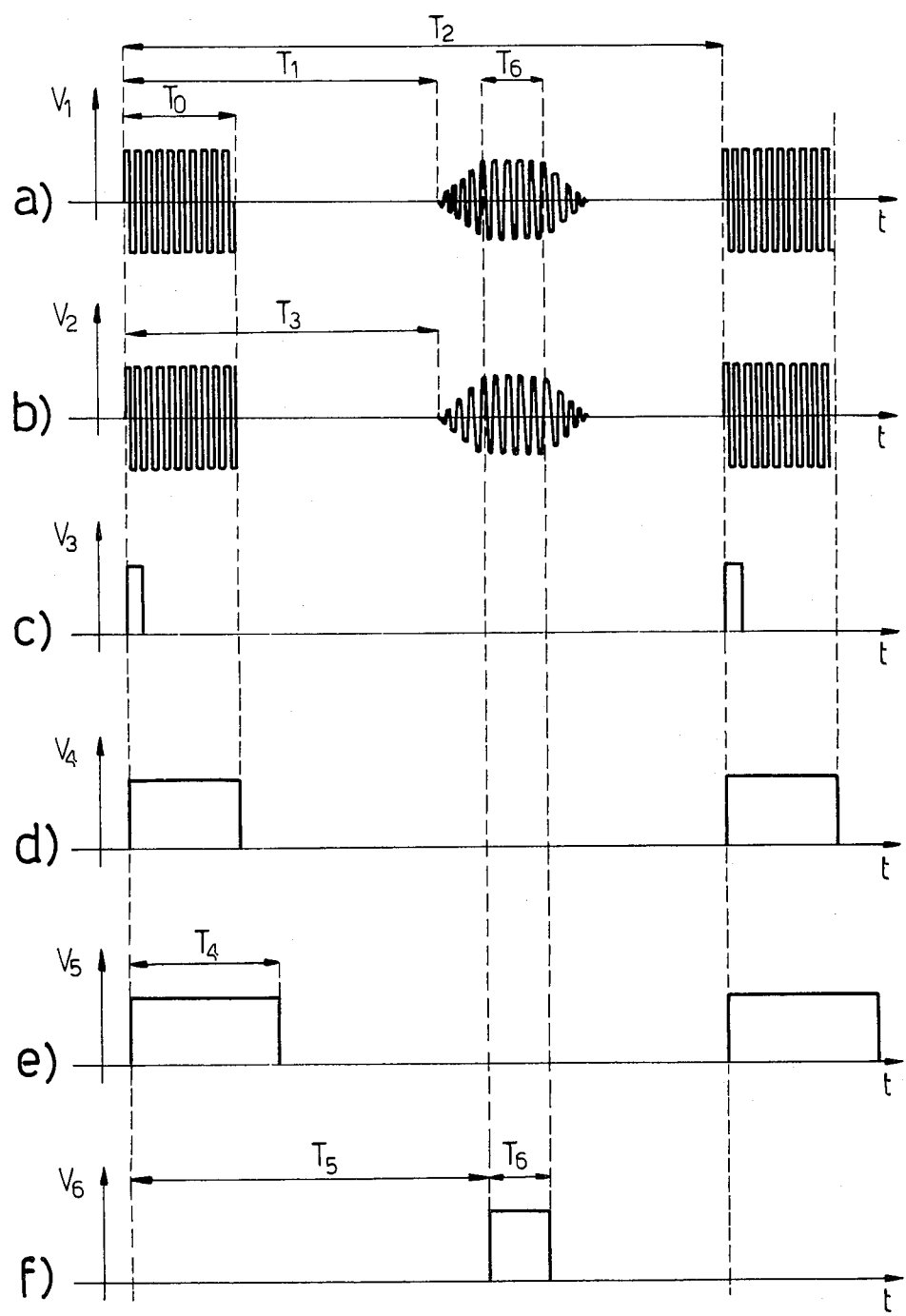
FIG. 3 shows the state of the electric signals taken at certain points shown in FIG. 2.

FIG. 3 graphically illustrates the behavior of the electric signals $V_1$, $V_2$, $V_3$, $V_4$, $V_5$, $V_6$ versus time, which signals are measured at the points indicated in the block diagram of FIG. 2.

Figure 4:
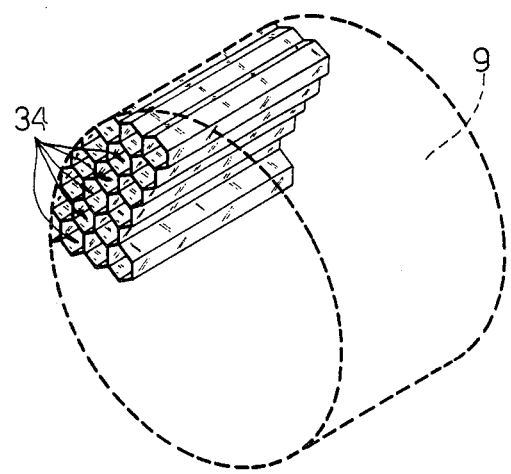
FIG. 4 is a perspective view from above of a preferred embodiment of the collimator used in the measuring device of FIG. 2.

Referring in particular to FIGS. 1 and 4, the collimator 9 has substantially a structure with honey-comb cross section having dimensions which are the same as those of the cross section of the conduit 6 at the area 10, and is formed with a plurality of through holes 34 which are parallel to each other and also to the axis of the conduit 6. The collimator 9 can be produced from any material sufficiently stiff and strong, taking care to minimize the ratio of the cross-sectional area of the material to the cross-sectional area of the holes 34.

Before proceeding to describe the operation of the measuring device 33, a theoretical digression concerning law correlating the phase difference of the ultrasonic waves received by the transducers 1, 2, and the delivery of the fluid in conduit 6 will aid in helping the reader to understand the present invention. Let us make the hypothesis, which is generally accurate, that the speed $\vec{u}$ of the modulus and direction of the fluid at all points along the conduit 6 are constant.

With reference to FIG. 1, the modulus of the speed $\vec{C_1}$ of propagation of an ultrasonic wave emitted from transducer 1 and propagating toward transducer 2 along a line connecting them, is given by:

$$C_1 = u\cos\theta + \sqrt{c^2 - u^2\sin^2\theta} \quad (1)$$

and likewise the modulus of the speed $\vec{C_2}$ of propagation of an ultrasonic wave emitted from transducer 2 and propagating toward transducer 1 along a line connecting them, is given by:

$$C_2 = -u\cos\theta + \sqrt{c^2 - u^2\sin^2\theta} \quad (2)$$

Denoting the frequency of the ultrasonic waves by "v" the internal diameter of conduit 6 by "d", the phase change undergone by the wave emitted from transducer 1 and propagating to transducer 2 is:

$$\phi_1 = \frac{2\pi v d}{\sin\theta (u\cos\theta + \sqrt{c^2 - u^2\sin^2\theta})} \quad (3)$$

whilst the phase change of the wave emitted from the transducer 2 and propagating to transducer 1 is:

$$\phi_2 = \frac{2\pi v d}{\sin\theta (-u\cos\theta + \sqrt{c^2 - u^2\sin^2\theta})} \quad (4)$$

The difference between the phase changes $\phi_1$ and $\phi_2$ is:

$$\delta\phi = \frac{2\pi v d}{\sin\theta} \cdot \frac{2u\cos\theta}{c^2 - u^2} \quad (5)$$

and therefore, setting $\phi = \pi/2 - \theta$, we get:

$$\delta\phi = 4\pi v d\, tg\alpha \frac{u^2}{c^2}\left(\frac{1}{1 - u^2/c^2}\right) \quad (6)$$

For most practical applications, it is possible to neglect the term $u^2/c^2$, so that the relation between phase difference $\delta\phi$ and delivery of the fluid becomes linear. Denoting the delivery in mass by "g" the density of the fluid by $\rho$, we get:

$$G = \frac{\pi d^2}{4} \rho \cdot u \quad (7)$$

whereupon:

$$\delta\phi = \frac{16v}{d} tg\alpha \frac{G}{\rho c^2} \quad (8)$$

For all the fluids the product $\rho c^2$ is a characteristic of the fluid which is relevant to its thermodynamic conditions; for liquids:

$$\rho c^2 = 1/\chi$$

where $\chi$ is the adiabatic compressibility; for gases:

$$\rho c^2 = \gamma p$$

where $\gamma$ is the specific heat ratio and $p$ is the pressure of the gas.

The operation of the measuring device 33 will now be described.

The fluid, the delivery of which is to be measured is fed into inlet section 6a of conduit 6, flows through collimator 9 and the section in which transducers 1 and 2 are placed, and leaves conduit 6 through outlet section 6b. The particular structure of the collimator 9 allows the radial components of the speed vector of the fluid fed to the inlet section 6a to be reduced to a negligible value. The operation of the electronic circuit takes place in two stages, in the first of which the electroacoustic transducers 1, 2 are connected, through the switch terminals 17 and 19 of the switches 15 and 16, with the outlet of the transmission unit 12. In the second stage, the transducers 1, 2 are connected with the inlet of the reception unit 14 through the switch terminals 18 and 20 of switches 15 and 16, respectively.

The position taken by the switches 15 and 16 is established by the level of the signal $V_5$, which is delivered by the timing circuit 32 and is illustrated in FIG. 3, part e; the sampling circuit 26 is activated by the level of the signal $V_6$ delivered by the timing circuit 31 and illustrated in FIG. 3, part f; in the end, the oscillator 22 is activated by the level of the signal $V_4$, which is delivered by the timing circuit 30.

The timing circuits 30, 31, 32 are activated by the impulse generator 29, the outlet tension $V_3$ of which is illustrated in FIG. 3, part c.

In particular, the positions of the switches 15 and 16 illustrated in FIG. 2 correspond to their true position during the first stage.

During the first stage, the signal produced by the oscillator 22 is fed, through the amplifier 21 and the terminals 17 and 19 of the switches 15 and 16, to the transducers 1 and 2, each of which emits ultrasonic pressure waves, which propagate in the moving fluid and impinge on the opposite transducer. The time during which the signal is fed to the transducers is denoted by $T_0$ in FIG. 3, part a.

The first stage ends with the commutation of the switches 15 and 16 toward the terminals 18 and 20, said commutation being controlled by the signal $V_5$ at the end of time $T_4$ (shown in FIG. 3, part e).

Thereafter, the second stage starts, during which the transducers 1 and 2 act as receivers, sending the received signals to the inlet of the reception unit 14. In particular, the signals received from transducers 1 and 2 are sent, through amplifiers 23 and 24, respectively, to the comparator 25 which measures the phase difference of the signals. The outlet signal of the comparator 25 is sampled during the time interval $T_6$ represented in FIG. 3, parts a and f, and then processed in the circuit 27, which allows the phase difference so measured to be correlated with the delivery of the fluid. The outlet of the circuit 27 then controls the display unit 28.

From an examination of the features of the device 33 realized according to the present invention, it can be seen that the drawbacks of the known and previoiusly discussed devices are avoided.

The use of the collimator 9 allows delivery measurements to be carried out with good reliability even on highly turbulent fluids such as gases.

Due to the high sampling rate, the device 33 can be used advantageously for delivery measurements in the automotive field, especially in direct injection engines. Indeed, by having the two transducers transmit simultaneously for a length of time such that about 40 ultrasonic waves are transmitted (i.e., for 160 μsec at a frequency of 250 KHz), and then switching the transducers to the reception mode, it is possible to have measurement times on the order of 400 μsec, whereas in the known devices it is impossible to decrease measurement times below several milliseconds.

Finally, the use of the timer 30 strictly defines the length of time during which the signal is transmitted to the transducers 1 and 2 and therefore eliminates the background noise due, for instance, to undesired electromagnetic connections.

It is clear that the above-described device 33 can be changed and modified without departing from the scope of the present invention.

For instance, if inverted flows take place in an engine in certain situations, a second collimator can be installed, conveniently one less deep than collimator 9, immediately downstream of transducers 1 and 2 and occupying entirely section 6b of the conduit 6. In this way it would be possible also to accurately measure the delivery of such inverted flows and therefore the true delivery of air to the engine.

We claim:

1. A device for measuring the delivery of a fluid in a conduit comprising:
    (a) first and second electroacoustic transducers arranged in the wall of a pipe forming said conduit and disposed in a confronting relationshp with each other along an axis which is inclined at a predetermined angle relative to the axis of said conduit, each of said transducers being able to convert an electric signal of predetermined frequency into an ultrasonic wave which propagates through said fluid and to convert a received ultrasonic wave into an electric signal;
    (b) a collimator disposed in the path of said fluid upstream of said transducers, extending completely across the cross-sectional area of said conduit and forming a plurality of throughholes which are parallel to each other and to the axis of said conduit;
    (c) a first oscillator for generating electric signals of said predetermined frequency;
    (d) a phase comparator circuit for detecting the phase difference between the ultrasonic signals received by said respective transducers;
    (e) first and second switching means for operatively coupling said first and second transducers, respectively, to said first oscillator and to said phase comparator circuit;
    (f) a first timing circuit for controlling said switching means such that both of said transducers are coupled first to said first oscillator and second to said phase comparator circuit in alternating sequence;
    (g) a sampling circuit connected to receive signals from said phase comparator circuit;
    (h) a second timing circuit for controlling said sampling circuit;
    (i) a processing circuit connected to receive signals from said sampling circuit and to correlate said detected phase difference with the delivery of fluid in said conduit; and
    (j) a display means for displaying symbols in response to electric signals received from said processing circuit.

2. A device as claimed in claim 1, further comprising a third timing circuit connected to said first oscillator for enabling the generation of electric signals for a predetermined interval of time.

3. A device as claimed in claim 2, further comprising a second oscillator for controlling said first, second, and third timing circuits in synchronism.

4. A device as claimed in claim 1, wherein said collimator has a honey-combed cross-section.

* * * * *